INVENTOR.
JOSEPH T. Del VECCHIO
ATTORNEY

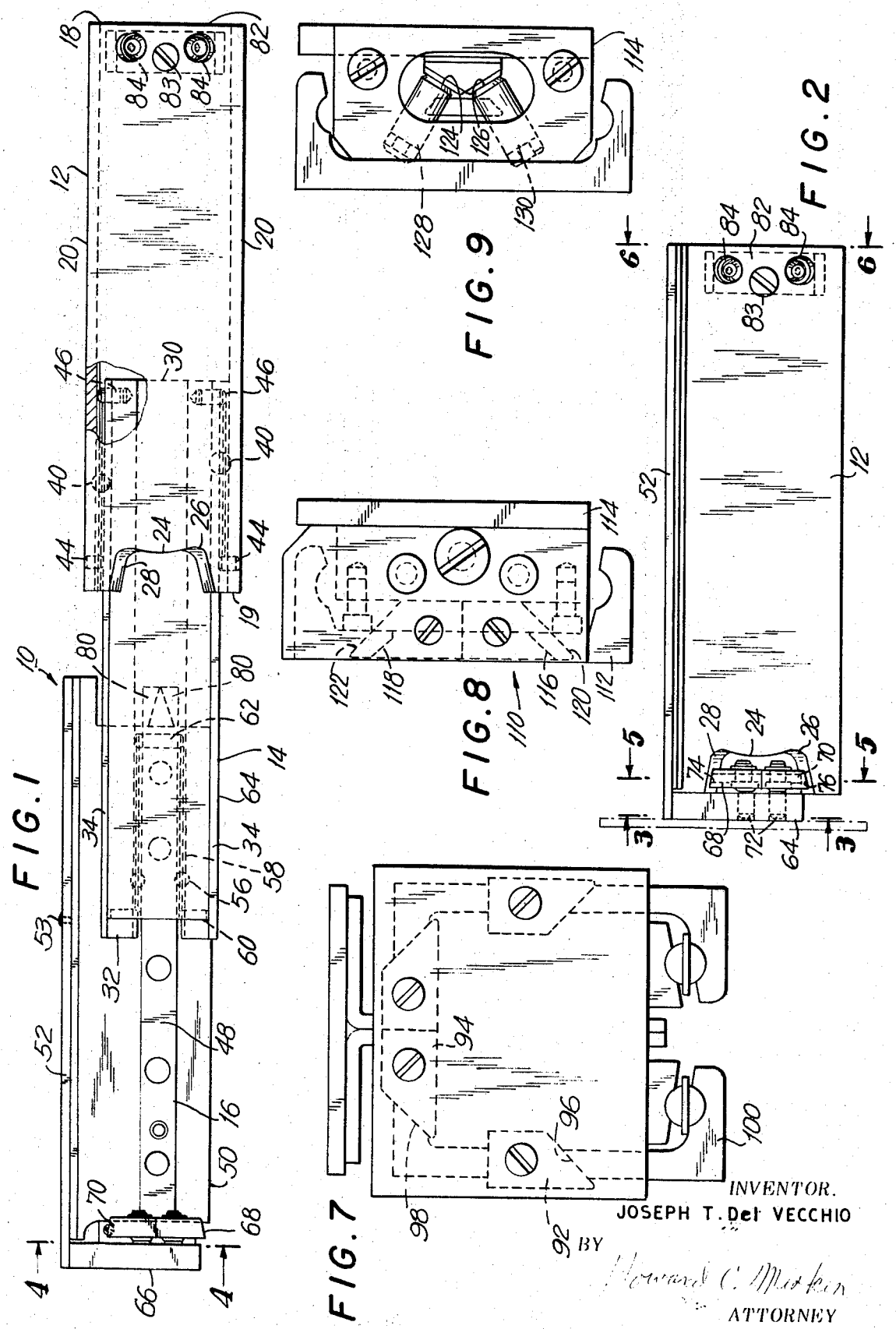

United States Patent Office 3,545,824
Patented Dec. 8, 1970

3,545,824
SHOCK AND VIBRATION RESISTING SLIDE ASSEMBLY
Joseph T. Del Vecchio, Nanuet, N.Y., assignor, by mesne assignments, to Instrument Systems Corporation, New York, N.Y., a corporation of New York
Filed June 21, 1968, Ser. No. 739,006
Int. Cl. A47b *88/04;* F16c *29/02*
U.S. Cl. 308—3.8          10 Claims

ABSTRACT OF THE DISCLOSURE

A shock and vibration resistant slide assembly that requires little or no separating force to open the slide assembly, includes an outer and an inner slide member telescopically moveable relatively on anti-friction bearing means. Each member has, adjacent its forward and rearwards ends, a pair of surfaces lying in different planes, with one surface of each pair of one member cooperatively abutting a mating surface of the other member, when the slide members are in closed position, for removing the weight of the slide members and supporting structure off the bearing elements and reducing vibration-transmissibility between the inner and outer slide members. One of the surfaces of each of the mating pairs of surfaces at each end is moveable so as to adjust the degree of contact between mating surfaces, when the slides are in closed position.

---

This invention relates to slide assemblies for drawers and chassis and the like, having two or more slide elements relatively movable longitudinally on anti-friction bearing means disposed between cooperating or mating track surfaces on the elements. More particularly, this invention relates to an improved shock and vibration resisting support for slide assemblies, which reduces and prevents excessive amplification of transferred shock or vibration to the slide mounted chassis and reduces ball depression into the slide members of the elements when in the closed or retracted position.

Today drawer type storage having slide mechanisms are widely used, especially for various electronic applications. Slide mechanisms provide quick efficient access to system components for purposes of maintenance and replacement, such as to trouble-shoot equipment, insert plug-in modules, change tape decks, pull out logic racks, etc. Slide mechanisms with balls forming the anti-friction bearing means between the elements are widely used today. These types of slides provide precision sliding mechansim. When these slides are stationary under a relatively heavy load, the balls tend to indent the track, particularly where the slide elements are relatively lightweight and of softer metal, such as aluminum and some of its alloys. These indentations result in rough operation of the slide thereafter, as the balls move along the track and over the indentations. Further, these systems are subjected to shock, such as when moved by truck, ship, aircraft and the like, and the ball grooves of the slides subjected to these vibrations would soon evidence brinell marks and galling. Additionally, when the slide mechanism is in the closed or retracted position, shock is transmitted through the frame and outer element through the bearing means to the units supported by the slide mechanism by the inner element. This transmission of the shock through the various elements of the slide assembly is frequently amplified, when the slide mechanism is in its closed or telescoped position. While the goal is to reduce the transmissibility of the shock from the frame to the object supported by the slide mechanism, it has been accepted that a 1–1 ratio is considered very good. Also, a resonant frequency may be set up during operation of the equipment supported by the slide mechanism.

Heretofore, in an effort to prevent excessive amplification of the shock and prevent brinelling of the ball grooves, various types of shock blocks have been provided, such as the use of pins and openings between the outer and inner elements to limit the transfer of shock or vibration from the stationery member to the equipment, which the slides support. Such shock blocks utilize a jamming action for effectiveness, which required careful aligning of the elements with the equipment in place, and a relatively large initial opening force to open the slide. The degree of force to open was much greater than if the slide mechanism did not have a shock block. Deflection of the slide under load increased the jamming action and greatly increased the break away force required to open the slide mechanism, oftentimes up to 25% of capacity.

Therefore, it is an objective of the present invention to provide a slide mechanism which prevents brinelling of the races by the balls due to shack or vibration and does not require additional break-away force to open the slide for accessibility to the equipment supported.

Another objective of the present invention is to to prevent or reduce amplification of vibration or shock when the slide mechanism is in its closed position.

A further objective of the present invention is to provide a shock block for a slide mechanism that can be readily adjusted prior to and during assembly without requiring disassembly of the unit.

A still further objective of the present invention is to provide a shock block for a slide mechanism which is easily adjustable after the load has been mounted on the slide to avoid jamming.

Still another objective is to provide an improved mounting arrangement of a shock block on a slide assembly, which is simpler and easily assembled.

Other objectives and advantages of this invention will be readily apparent from the following description in connection with the drawing, in which:

FIG. 1 is a side elevational view of a slide mechanism incorporating the invention in the open or extended position;

FIG. 2 is a side elevational view of the slide mechanism in closed or retracted position;

FIG. 7 is a cross-sectional view, generally similar to FIG. 3 of another embodiment of the invention;

FIG. 8 is a cross-sectional view, generally similar to FIG. 3, showing another embodiment; and FIG. 9 is a rear view of the embodiment shown in FIG. 8.

Figure 3:
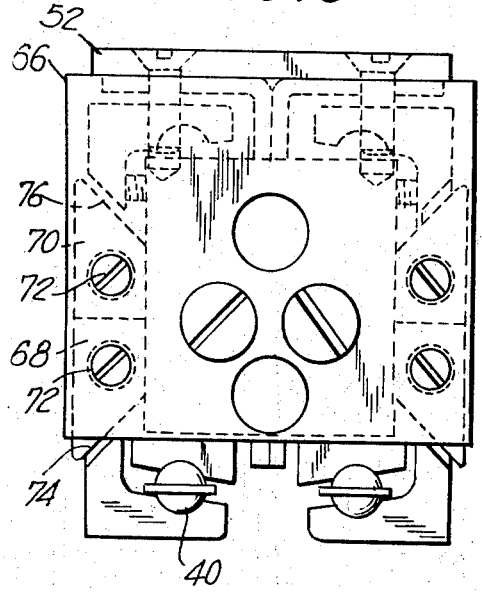
FIG. 3 is an enlarged side elevational view taken along line 3—3 of FIG. 2.
Figure 4:
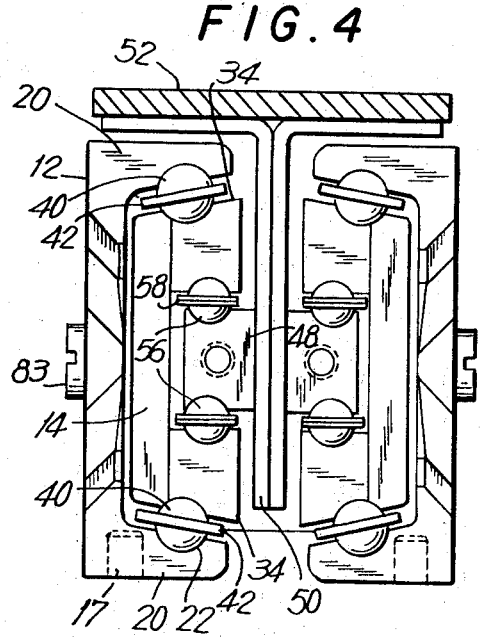
FIG. 4 is an enlarged cross-sectional view taken along line 4—4 of FIG. 1.
Figure 5:
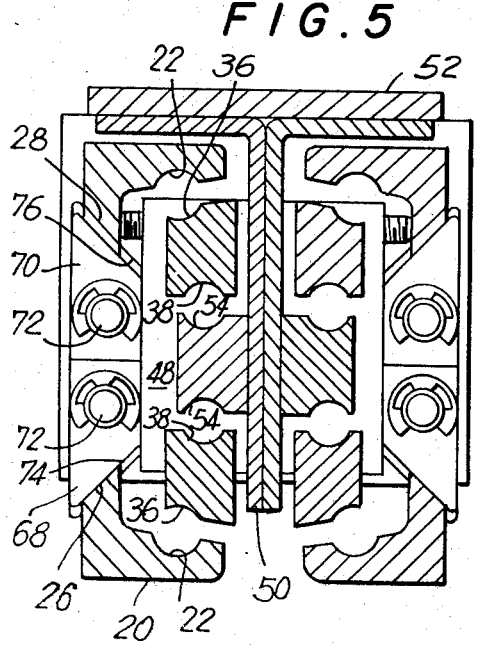
FIG. 5 is an enlarged cross sectional view taken along line 5—5 of FIG. 2.
Figure 6:
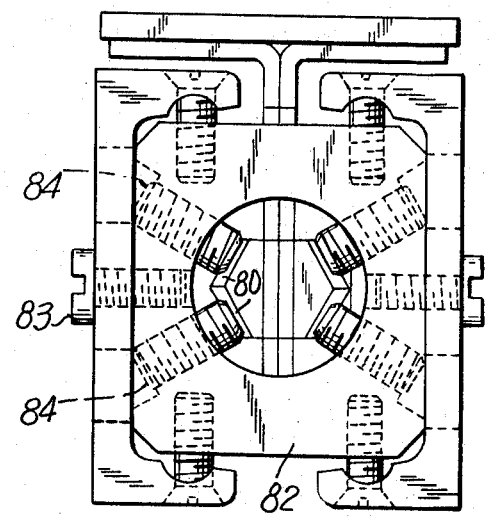
FIG. 6 is an enlarged rear view taken along line 6—6 of FIG. 2.

Referring to FIGS. 1–6 of the drawing, numeral 10 represents a slide which is shown for illustrative purposes only, since many types of slides may have the shock blocks applied, which are the subject matter of this invention, and which may be used with any type of slide having antifriction bearings, such as balls, engaged in the facing track surfaces. The slide assembly 10 comprises an outer channel or support element 12 telescopically receiving an intermediate channel or support element 14, which telescopically receives an inner channel or support element 16. Normally inner support element 16 has the equipment or drawer mounted to it. Slide 10, as shown, is intended to have the equipment mounted on its upper surface, which is attached to inner element 16. Outer element 12 is rigidly fixed by screws, bolts or the like, 17, to the cabinet on its bottom or lower surface. Other forms are discussed below. Slide 10 is formed of two identical parts, as seen in FIGS. 4–6, joined along the longitudinal central plane and only one side will be discussed. Like numerals, indicate like parts and corresponding parts of the mirror part will have corresponding numerals primed.

Outer member or element 12 has a vertical rear edge 18, a forward vertical edge 19, and a pair of longitudinal flanges 20, extending the length thereof, forming a channel whose inner surfaces, as seen best in FIG. 5, have arcuate cross-sectional track surfaces 22 formed therealong. Front vertical edge 19 has a portion cut-away indicated at 24 in FIGS. 1 and 2 intermediate of longitudinal flanges 20. The generally longitudinal edges of cutaway 24 are generally tapered, indicated at 26 and 28 respectively, with the larger taper being outside, so as to direct a force inwardly toward the central longitudinal plane.

Intermediate element 14, which is received within the channel of element 12, has a rear vertical edge 30 and a forward vertical edge 32, with a pair of longitudinal flanges 34 extending the length thereof forming a channel. Longitudinal flanges 34 have arcuate cross-sectional track surfaces 36 therein facing track surfaces 22 in flanges 20 of outer member 12, and arcuate cross-sectional track surfaces along their inner longitudinal surfaces. Element 14 is movable longitudinally of element 12 on balls 40 mounted in spacers 42, which are received in races formed from track surfaces 22 and 36.

Mounted on flanges 20 of outer element 12 are stop pins 44 extending into arcuate track surfaces 22 to prevent escape of the balls. Similarly, mounted on flange 34 of intermediate element 14 are stop pins 46 extending into the ball race formed between track surfaces 36 and 22. Stop pins 44 and 46 cooperate to limit extension of elements 12 and 14 by engaging ball retainer 42 or absent retainer 42, engaging balls 40.

In the particular slide 10, selected for illustration, inner or equipment mounting element 16 has a generally rectangular cross-sectional portion 48 fixedly attached to an angle web or arm 50.

As seen in FIGS. 4 and 5, a pair of slides support the equipment, not shown. The pair of angle webs 50 are mounted back to back and support a plate or member 52 on which is mounted the equipment or is a drawer supporting member. Plate 52 is shown attached to angle webs 50 by screws 53. Upper and lower longitudinal surfaces of portion 48 are formed with arcuate cross-sectional track surfaces 54 aligned with track surfaces 38 in intermediate element 14. Track surfaces 54 and 38 form a ball race and receive balls 56 set in retainers 58, as seen best in FIG. 5. Relative outward extension of element 16 with respect to intermediate element 14 is limited by engagement of ball retainers 58 with stop ends 60 mounted on intermediate element 14 and pins 62 mounted on element 16. The front of panel 64 is indicated in shadow in FIG. 2. Mounted on the front vertical edge of inner element 16 adjacent front panel 64 is front shock block assembly 66 which comprises a pair of wedging blocks 68 and 70 which as seen best in FIGS. 2 and 5 are movable both vertically and horizontally by means of adjusting screws 72. Block 68 has a generally tapered downwardly diagonally extending surface 74 which cooperatively mates with tapered surface 26 of cut-away 24 of outer element 12. Similarly, block 70 has a generally tapered upward diagonally extending surface 76 which cooperatively mates with tapered surface 28 of cut-away 24 of outer element 12. Surfaces 74 and 76 lie in different planes. Blocks 68 and 70 are adjustable to make gradual but positive contact with their corresponding surfaces of cut-away 24 when slide assembly 10 is in closed operating condition.

Referring primarily to FIG. 6, the rear shock block assembly 82 is shown. The rear vertical edge of inner element 16 has a pair of flattened tapered angular surfaces 80 in different planes. Mounted on the rear vertical edge 18 of outer element 12, such as by bolts 83, is rear shock block assembly 82, which as shown best in FIG. 6, has a plurality of movable bolts 84 lying along an axis transverse to a plane containing a corresponding surface 80. Bolts 84 have flattened bottom surfaces which engage corresponding tapered portions 80 of rear vertical edge of inner member 16, when assembly 10 is in closed position. Bolts 84 are adjusted when assembly 10 is in its closed or retracted position, so that surfaces 80 abut the ends of their corresponding bolts 84. The tapered surfaces allow gradual contact between flats 80 on inner element 16 and ends of bolts 84 on outer element 12. In the embodiment as shown, the other slide mechanism has similar bolts and corresponding flats on the end of its inner element, so that the force is equally, but oppositely applied.

In accordance with the invention, when slide mechanism 10 is retracted in closed position, the load is effectively removed from balls 40 and 56 by virtue of the tapered surfaces of shock block assemblies 66 and 82, which effectively eliminates the downward load on balls 40 and 56 in their respective channels 22 and 36, and 38 and 54. The mating tapered surfaces 68 and 70 of front assembly 66 on inner element 16 are adjusted so as to cooperatively mate with tapered surfaces 26 and 28, respectively, of cut-away portion 24 on outer element 12, and the rear end of inner element 16 is cooperatively received within the points of contact defined by the flat ends of bolts 84 mounted on rear vertical end of outer member 12, so that the load on the slide elements is reduced and effectively eliminated from balls 40 and 56. Consequently, when slide assembly 10 is retracted, the wedging action of the front and rear shock block assemblies 66 and 82, respectively, by reason of the limited lines of contact of the mating tapered surfaces 68 and 70, and 26 and 28, respectively, effectively makes the slide assembly into a solid structure for shock and vibration purposes, which are transmitted directly from outer element 12 to inner element 16, thus preventing excessive amplification of shock or vibration to the slide mounted chassis.

Since the wedging and contact action of the front and rear assemblies 66 and 82, respectively, do not depend on jamming action, such as a pin and hole, no additional breakaway force is required to open the slide assembly. This advantage avoids personnel from exerting a large opening force on the assembly, which could be in an awkward position.

The embodiment in FIG. 7 shows an alternative positioning of wedging blocks 92 and 94, which cooperate with tapered surfaces 96 and 98, respectively, on outer element 100. The taper is in two directions, which effectively joins the inner and outer elements to form essentially a single structure for shock and vibration purposes.

In the embodiment of FIGS. 8 and 9 is shown the slide assembly 110 having its outer element 112 rigidly attached by screws or the like on the inside of a suitable cabinet. Slide assembly 110 is mounted on each side of the cabinet for each chassis, which is mounted between the inner elements 114 of each assembly. As is evident, wedge blocks 116 and 118 on inner element 114 cooperate with tapered surfaces 120 and 122, respectively, on outer element 112, in a similar manner as discussed above. Similarly, the rear end of inner element 114 has angular flats 124 and 126, which abut the flat ends of bolts 128 and 130, respectively. The direction of the tapered surfaces of the two slide assemblies causes a force to be directed inwardly toward the chassis or equipment being supported.

As seen best in FIG. 3, the front shock block assembly 66 can be adjusted while the slide assembly is in closed or retracted position by means of bolts 72, which are accessible through the front panel 64, so as to properly adjust the shock block operation while in assembled, loaded condition, so as to eliminate the jamming heretofore inherent in the use of prior art shock blocks. This adjustment eliminates any misalignment due to prior assembly of a pin and hole arrangement. Similarly, the rear shock block assembly can be adjusted while the assembly is closed and the load applied.

While the tapered surfaces 68 and 70 are shown mounted on the front end of inner member 16, they may also be mounted on the side surfaces adjacent the front end. This placement is less effective in adjusting the cooperative mating surfaces while in the closed loaded condition, when the assembly is close to a cabinet wall in closed position.

While the combination of ends 66 and 82 are shown being used, other combinations may be used. The front end assembly 66 can be used also in the rear. Also, other shock blocks could be used in place of 82 in combination with the tapered surfaces of front assembly 66.

While specific embodiments of the invention have been shown and described in detail to illustrate the application of the invention, it will be understood that alterations and modifications may be resorted to without departing from the scope of the invention and such alterations and modifications are intended to be included within the scope of the appended claims.

Wherever the term "cabinet" is used in the description or claims, it is deemed to include a frame, a cabinet or an outer support structure. Wherever the term "chassis" is used in the description or claims, it is deemed to include a chassis, equipment, drawer, mechanism or the like.

What I claim is:

1. A shock and vibration resistant slide assembly for movably supporting a chassis in a cabinet, comprising a first slide member and a second slide member, wherein one slide member is a cabinet slide and the other of said slide members is a chassis slide member, said cabinet slide member being adapted to be affixed to said cabinet, said chassis slide member being adapted to be coupled to said chassis, means slidably interconnecting the slide members and providing the slide members to be relatively movable longitudinally between an open position and a closed position so that said chassis is relatively movable with respect to said cabinet, a pair of surfaces, each lying in different planes, carried by said first slide member adjacent one end, a pair of surfaces on said second slide member adjacent its end corresponding to the one end of said first member, each of said last-mentioned surfaces cooperatively engaging a corresponding one of said first-mentioned surfaces, when said slide members are in the closed position so as to reduce the weight of said slide members on said bearings and reduce vibration-transmissibility between the inner and outer members.

2. A slide assembly in accordance with claim 1, wherein the surfaces of one of said pairs of surfaces are tapered.

3. A slide assembly in accordance withh claim 1, wherein said surfaces are generally smooth, and mating surfaces cooperatively engage simultaneously; further, one of the surfaces of each pair of surfaces facing about 180 degrees from the other surface of the pair.

4. A slide assembly in accordance with claim 1, further including a third pair of surfaces, each lying in different planes and carried by said second slide member, and a fourth pair of mating surfaces carried by said first slide member, each cooperatively engaging a corresponding one of said third pair of tapered surfaces when said slide members are in closed position.

5. A slide assembly in accordance with claim 1, wherein one of each pair of surfaces is adjustable, so as to make contact with its corresponding mating surface when said slide members are in closed position.

6. A slide assembly in accordance with claim 1, further including a shock block carried by said first member adjacent its other end, said shock block containing a pair of surfaces lying in two planes, and a mating element on said second member having a mating pair of surfaces cooperatively engaging said surfaces on said shock block when said slide members are in closed position for forming a connection therebetween.

7. A slide assembly in accordance with claim 6, wherein one of each pair of surfaces at each end of said slide members are tapered and the mating surface of each of said tapered surfaces being adjustable in closed assembled position so as to abut its corresponding tapered surface.

8. A slide assembly in accordance with claim 2, the taper on each of the tapered surfaces being greater adjacent the outer edge of its corresponding member, so as to exert an inwardly directed force on said inner member when said slide members are in closed position.

9. A slide assembly in accordance with claim 1, wherein said slide members have flanges formed with track surfaces facing each other, and said slidable interconnecting means including ball bearings seated in said track surfaces.

10. A slide assembly, comprising at least two telescoping slide members, one member being an outer member and the other being an inner member, a pair of tapered surfaces in different planes carried by said outer member, and a pair of mating surfaces in two planes carried by said inner member and cooperatively engaging with corresponding ones of said first pair of tapered surfaces when said members are telescoped, a shock block carried by said outer member and a mating element on said inner member cooperatively engaging said shock block for forming a connection therebetween in closed telescoped position, said shock block containing a pair of surfaces, each lying in two planes and said inner member having a pair of tapered surfaces cooperatively engaging said surfaces of said shock block in closed position, said surfaces of said shock block being ends of adjustable bolts, which ends can be varied along their respective axes.

References Cited

UNITED STATES PATENTS

| | | | |
|---|---|---|---|
| 2,801,887 | 8/1957 | Gussack | 308—3.8 |
| 2,926,048 | 2/1960 | Gussack | 308—3.8 |
| 3,039,838 | 6/1962 | Koch | 312—348X |
| 3,258,299 | 6/1966 | Meyer | 308—3.8 |

FOREIGN PATENTS

| | | | |
|---|---|---|---|
| 555,317 | 7/1954 | Canada | 312—348 |
| 824,093 | 11/1939 | Great Britain | 312—348 |

MANUEL A. ANTONAKAS, Primary Examiner

U.S. Cl. X.R.

312—348